United States Patent [19]
Kageyama et al.

[11] Patent Number: 5,269,266
[45] Date of Patent: Dec. 14, 1993

[54] V-TYPE TWO CYCLE SUPERCHARGED ENGINE

[75] Inventors: Akira Kageyama; Hiroyuki Yamashita; Shigeru Sakurai, all of Hiroshima, Japan

[73] Assignee: Mazda Motor Corporation, Hiroshima, Japan

[21] Appl. No.: 2,833

[22] Filed: Jan. 15, 1993

[30] Foreign Application Priority Data

Jan. 20, 1992 [JP] Japan .................................. 4-007522

[51] Int. Cl.$^5$ ..................... F02B 75/02; F02D 39/04
[52] U.S. Cl. ................................ 123/65 B; 123/559.1
[58] Field of Search ............... 123/559.1, 65 B, 65 BA

[56] References Cited

U.S. PATENT DOCUMENTS

| | | | |
|---|---|---|---|
| 4,480,968 | 11/1984 | Doerr | 123/65 B |
| 5,121,733 | 6/1992 | Goto et al. | 123/559.1 |

FOREIGN PATENT DOCUMENTS

| | | | |
|---|---|---|---|
| 0176070 | 9/1953 | Austria | 123/559.1 |
| 0187740 | 11/1956 | Austria | 123/559.1 |
| 62-135655 | 6/1987 | Japan . | |

Primary Examiner—Richard A. Bertsch
Assistant Examiner—Charles G. Freay
Attorney, Agent, or Firm—Keck, Mahin & Cate

[57] ABSTRACT

A V-type two cycle, supercharged engine having scavenging ports for said cylinders includes a mechanical supercharger and a surge tank. A pair of rotors of the supercharger are horizontally arranged in parallel with each other with one positioned directly below the other and them supercharger is offset laterally toward one of the left and right banks from the center of the V-shaped space defined between the left and right banks. An air expulsion opening is formed in the supercharger housing on its side nearest to the other bank. The surge tank is disposed below the supercharger and is partly expanded upward on the side nearest the other bank.

5 Claims, 3 Drawing Sheets

V-TYPE TWO CYCLE SUPERCHARGED ENGINE

BACKGROUND OF THE INVENTION

1. Field of the Invention

This invention is concerned with a V-type two cycle internal combustion engine which has scavenging ports opening into cylinders and is equipped with a mechanical supercharger having a set of rotors.

2. Description of Related Art

Typically, reciprocal engines have intake ports which are formed in the cylinder head so as to open into cylinders. However, intake ports of two cycle engines are formed in the cylinder block so as to open into cylinders. For instance, Japanese Unexamined Patent Publication No. 62-135655 describes a two cycle engine in which scavenging ports are formed, as intake ports, in the cylinder block so as to open into cylinders. Following combustion, when the piston reaches the bottom dead center of a combustion stroke, fresh air is introduced through the scavenging ports and, at the same time, expels and pushes out burned gases into the exhaust ports.

In this instance, two cycle engines are often realized in V-type engines having two, i.e. left and right, cylinder banks. Such a two cycle V-type engine is equipped with a mechanical supercharger which has a set of rotors to supercharge intake air. In this instance, the supercharger is installed between the left and right cylinder banks of the engine, and a surge tank, which communicates with the scavenging ports, is displaced downstream the supercharger between the left and right cylinder banks. In this arrangement, if both rotors of the mechanical supercharger are lined up horizontally side by side, then, because of the structure of the mechanical supercharger, the air discharge opening formed in its housing faces upward. This leads to unavoidably increasing the overall height of the engine. In order to lower the overall engine height, the mechanical supercharger may be set up so that both rotors are aligned vertically, and then it may be lowered down so as to situate its top close to the bottom of the V-shaped space between the cylinder banks. However, such an arrangement of the mechanical supercharger causes the air discharge opening formed in one side wall of the housing to be blocked by one of the cylinder banks, and reduces the capacity of the surge tank which is also situated below the mechanical supercharger.

SUMMARY OF THE INVENTION

It is an object of this invention to provide a V-type, two cycle internal combustion engine equipped with a mechanical supercharger which is installed so as to situate its rotors vertically side by side without reducing the capacity of a surge tank, while effectively lowering the overall height of the engine.

The foregoing object is accomplished by providing a V-type, two cycle, supercharged engine which has scavenging ports for cylinders and is equipped with a mechanical supercharger having a pair of rotors which are horizontally arranged in parallel with each other and one of which is positioned directly below the other. A mechanical supercharger is positioned in a V-shaped space between the left and right cylinder banks so as to locate the rotors offset laterally toward either one of the left and right cylinder banks from a center of the V-shaped space. This arrangement of the mechanical supercharger creates what is called a "dead space" in the V-shaped space, in which an expanded portion of a surge tank is disposed.

Specifically, the mechanical supercharger has a housing disposed in the V-shaped space, a pair of rotors disposed in the housing, and an air expulsion opening formed in the housing. The rotors are arranged horizontally in parallel with each other with one positioned directly below the other and are offset laterally toward either one of the left and right cylinder banks from a center of the V-shaped space relative. The air expulsion opening of the mechanical supercharger is on one side of the other of the left and right cylinder banks. The surge tank is disposed below the mechanical supercharger and is partly expanded upward into the dead place formed between the mechanical supercharger and the other of the left and right cylinder banks.

A partition wall is disposed within the expanded portion of the surge tank so as to guide air introduced into the surge tank through the air intake opening toward a side portion of the surge tank remote from the expanded portion.

Since the rotors of the mechanical supercharger are arranged horizontally in parallel with each other with one positioned directly below the other, and the air expulsion opening is formed in a side wall of the housing, the overall height of the engine is reduced. By positioning the mechanical supercharger so that it is offset toward one of the left and right cylinder banks, the top of the mechanical supercharger can be lowered without blocking the air expulsion opening by the other cylinder bank, and consequently the overall height of the engine can also be lowered.

In addition, since the surge tank, positioned below the mechanical supercharger, is expanded upwardly into the dead space formed on the side opposite and adjacent to the side occupied by the mechanical supercharger, not only can the height of the mechanical supercharger be lowered, but the capacity of the surge tank can also be maintained to be large.

The air intake opening is formed in the expanded portion of the surge tank, and the partition wall is provided in the expanded portion of the surge tank so as to introduce air from the air intake opening into the surge tank. According to this structure of the surge tank, despite the air intake opening being offset toward one of the left and right cylinder banks as a consequence of the offset disposition of the mechanical supercharger, air introduced into the surge tank is directed preferentially to the portion of the surge tank, toward which air is generally difficult to flow, so as to be distributed substantially equally to the cylinders of the left and right cylinder banks.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Because mechanical superchargers and V-type two cycle engines are well known, the present description will be directed in particular to elements forming part of, or cooperating directly with, apparatus in accordance with the present invention. It is to be understood that parts or elements which are not of direct importance to the invention and parts or elements which are purely of conventional constructions will not be described in detail and that parts or elements not specifically shown or described can take various forms well known to those skilled in the automobile art.

Figure 1:
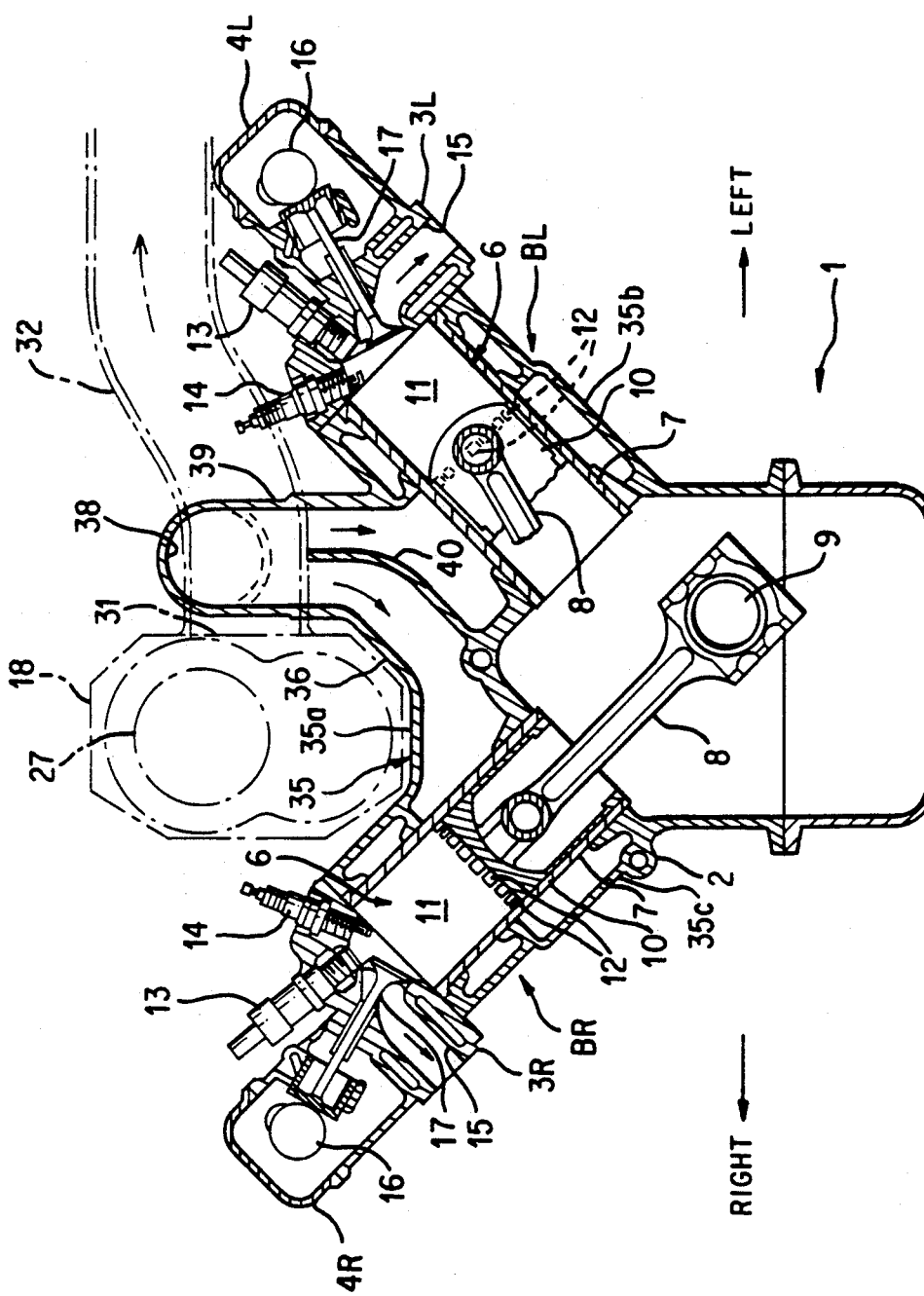
FIG. 1 is a cross-sectional view of a V-type, two cycle supercharged engine having scavenging ports in accordance with a preferred embodiment of the present invention.
Figure 2:
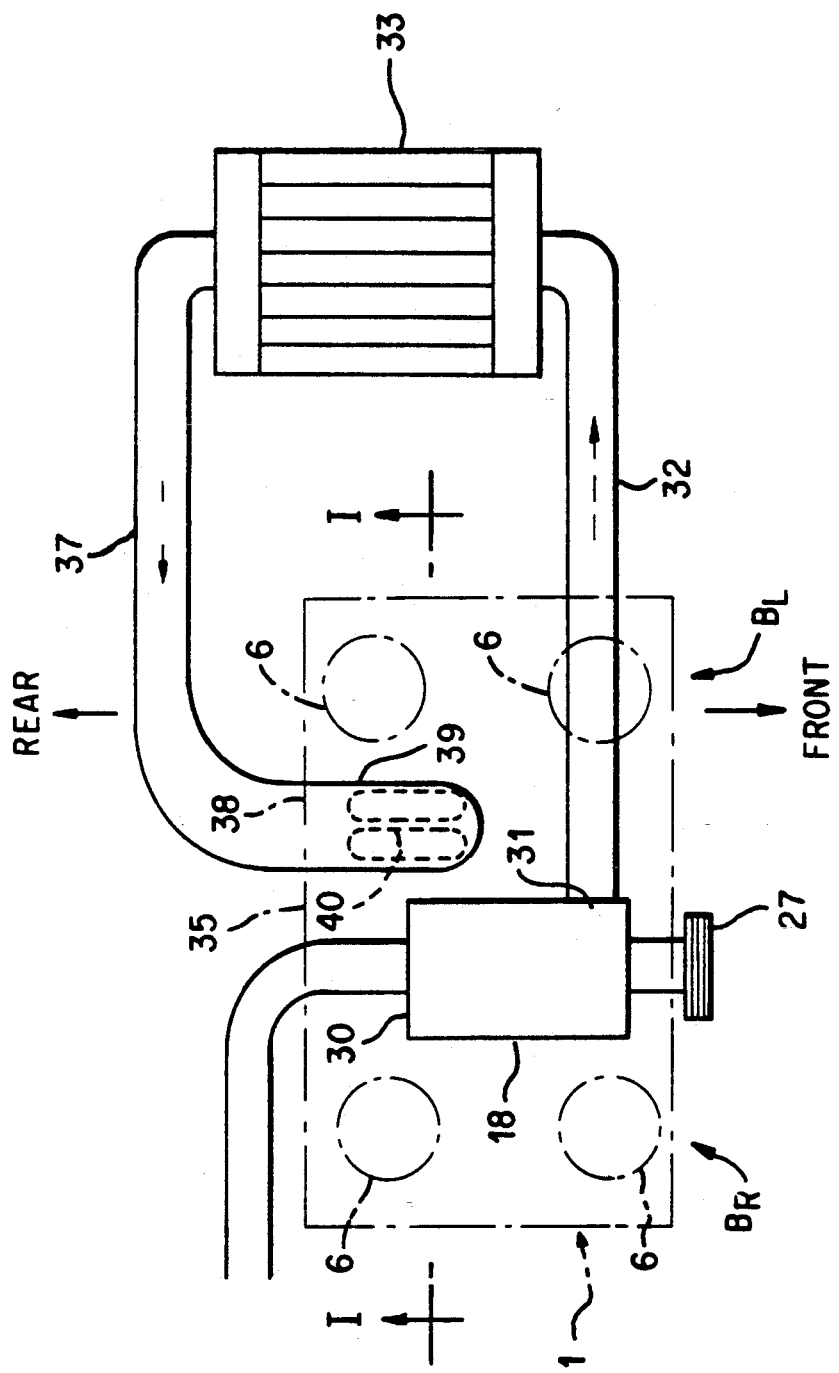
FIG. 2 is a schematic top view of the V-type, two cycle supercharged engine shown in FIG. 1.

Referring to the drawings in detail, and in particular, to FIGS. 1 and 2, a supercharger equipped, V-type two cycle, four cylinder engine 1 (which is hereafter referred to as an engine for simplicity) in accordance with a preferred embodiment of the present invention is shown, comprising a pair of, ie. left and right, cylinder banks BL and BR arranged in a V-formation with a predetermined relative angle. The engine 1 is composed of a cylinder block 2 having a generally V-shaped cross section, a pair, i.e. left and right, cylinder heads 3L and 3R mounted on the cylinder block 2, cylinder head covers 4L and 4R attached to the cylinder heads 3L and 3R, respectively, and an oil pan 5 attached to the underside of the cylinder block 2.

The left cylinder bank BL is provided with two cylinders 6, and the right cylinder bank BR is provided with two cylinders 6. Each of the cylinder 6 has a cylindrical cylinder liner 7 fitted therein, which comprise a part of the cylinder block 2. Within the respective cylinder liners 7, there are received pistons 10, respectively, which are connected to a crankshaft 9 by means of connecting rods 8. A combustion chamber 11 is formed in the cylinder by the top of the piston 10, the cylinder liner 7 and a lower wall of the cylinder head 3L, 3R. The cylinder liner 7 is formed with a plurality of openings 12, positioned around the middle portion of the cylinder liner 7, to form scavenger ports, which function as intake ports, in communication with a surge tank 35 which will be described later. The scavenging ports 12 open when the piston 10 reaches the bottom dead center so as to enable the combustion chamber 11 to communicate with the surge tank 35. While the scavenging ports 12 are open, air in the surge tank 35 is introduced into the combustion chamber 11 through the scavenging ports 12.

Each of the cylinder heads 3L and 3R is provided with fuel injectors 13 which inject fuel into the combustion chambers 11, and spark plugs 14 to ignite fuel mixture in the combustion chambers 11. Each of the cylinder heads 3L, 3R is further formed with exhaust ports 15 through which is expelled burned or exhaust gases from the combustion chambers 11. The exhaust ports 15 are opened and closed by exhaust valves 17, which are driven by means of a camshaft 16 in a well known manner. Specifically, the engine 1, which is of, for instance in this embodiment, a uniflow type of two cycle engine, takes air from the surge tank 35 into the combustion chamber 11 through the scavenging ports 12 when the piston 10 is at the bottom dead center, and following which, the scavenging ports 12 become closed with the upward movement of piston 10 and the air is compressed within combustion chamber 11 by the piston 10. During the combustion process which starts when piston 10 passes the top dead center and descends, the exhaust valve 17 opens to expel the exhaust gasses from within the combustion chamber 11 through the exhaust port 15. As the piston 10 approaches closely to the bottom dead center, it opens the scavenging ports 12 and scavenges the exhaust gases within the combustion chamber 11 by the aspiration of air through the scavenging ports 12.

Figure 3:
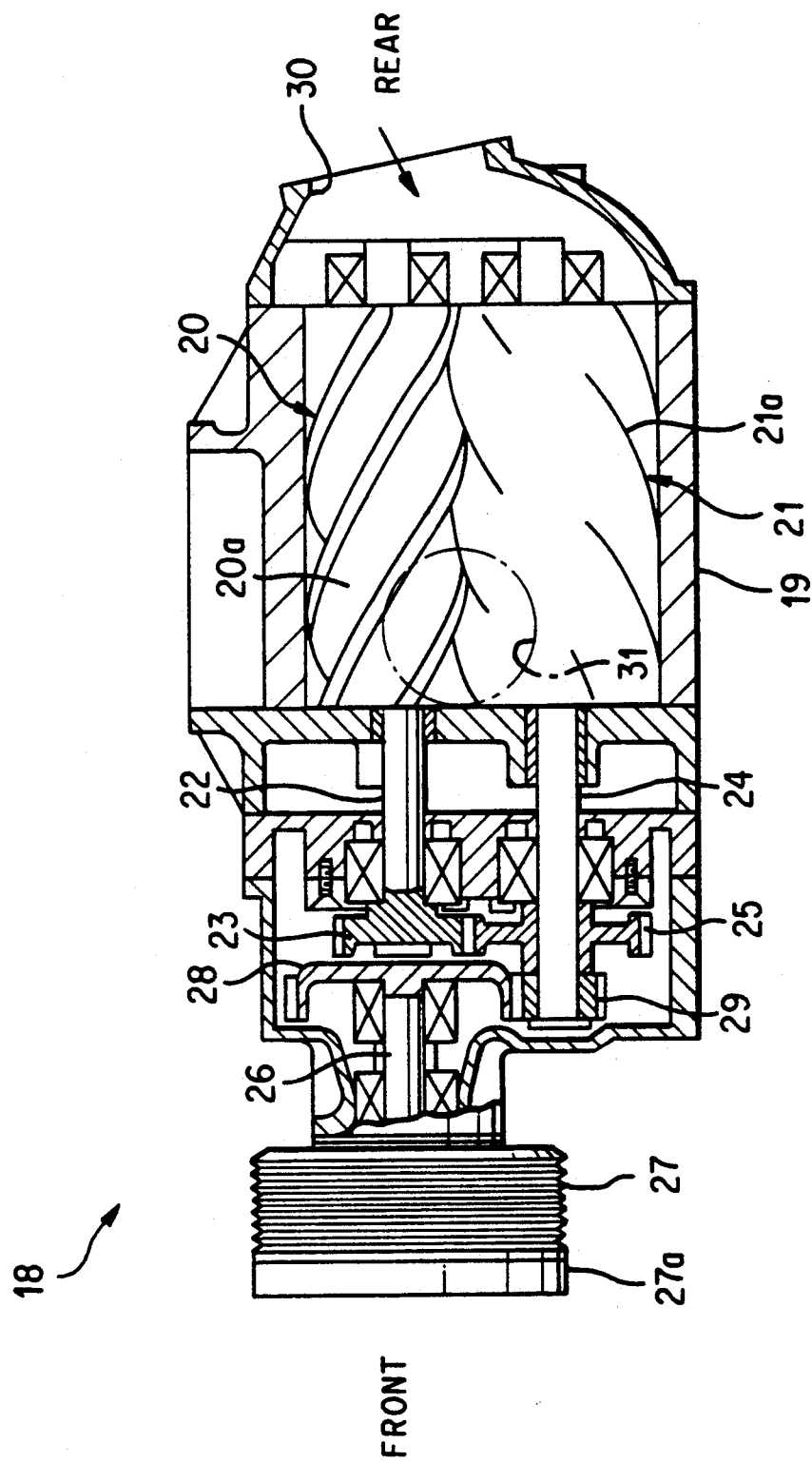
FIG. 3 is a cross-sectional view of a mechanical supercharger.

In the V-shaped space formed between the cylinder banks BL and BR of engine 1, there are disposed a mechanical supercharger 18, driven by the engine 1, for supercharging pressurized air to the engine 1, and the surge tank 35 positioned below the mechanical supercharger 18. The mechanical supercharger 18, as shown in FIG. 3, has an air-tight housing 19. The housing 19 encloses a set of rotatable female and male rotors 20 and 21. The female rotor 20 is formed with spiral grooves 20a, as is formed spiral threads 21a in the male rotor 21. The male rotor 21 is arranged in parallel with and horizontally positioned directly below the female rotor 20 so that the spiral threads 21a of the male rotor 21 are in mesh with the spiral grooves 20a of the female rotor 20. A shaft 22 of the female rotor 20 is provided with a gear 23 at its forward end. Similarly, a shaft 24 of the male rotor 21 is provided with a gear 25 at its forward end. These gears 23 and 25 are meshed with each other. In front of and coaxial with the shaft 22 of the female rotor 20, a shaft 26 is supported by the housing via bearings to be rotatable. The shaft 26 is provided with a pulley 27 at its forward end which is operationally coupled to the crank shaft 9 of the engine 1 through a drive belt (not shown). Between the pulley 27 and the shaft 26, there is provided an electromagnetic clutch 27a for operationally engaging and disengaging them. To the rear end of the shaft 26 is attached a gear 28, which is enmeshed with gear 29 attached to the forward end of the shaft 24 of the male rotor 21. The housing 19 is formed at its rear end with an air intake opening 30, which is connected to an air cleaner (not shown), and in its left side with an air expulsion outlet opening 31. When the female and male rotors 20 and 21 are rotated in opposite directions by the engine 1, air is aspirated in from the air intake opening 30, is pressurized by means of a plurality of compression chambers formed between and the cooperative action of the rotors 20 and 21, and then is expelled from the air expulsion outlet opening 31.

The mechanical supercharger 18 is offset a specified distance toward the right cylinder bank BR from the center of the right and left cylinder banks BL and BR of the engine 1, see FIG. 2. The air expulsion opening 31, which opens in its side facing to the left cylinder bank BL, is connected with the upstream end of an air intake pipe 32. This air intake pipe 32 extends to the left, passing above the left cylinder bank BL, and is connected at its downstream end to an intercooler 33 which cools air compressed by the mechanical supercharger 18 and leads it by duct 37 forward the surge tank 35.

The surge tank 35, which is formed as a single or integral unit with the cylinder block 2 of the engine 1, is comprised of three parts, i.e. a middle part 35a, a left portion 35b and a right portion 35c. The middle portion 35a of the surge tank 35 extends between the left and right cylinder banks BL and BR and accommodates the mechanical supercharger 18 which is placed thereon. The left portion 35b of the surge tank 35 is shaped so as to surround almost the lower halves of the cylinder liners 7 of the two cylinders 6 of the left cylinder bank BL and to communicate at its upper end with the scavenging ports 12 of each of these cylinders 6 at all times.

Similarly, the right portion 35c of the surge tank 35 is shaped so as to surround almost the lower halves of the cylinder liners 7 of the two cylinders 6 of the right cylinder bank BR and to communicate at its upper end with the scavenging ports 12 of each of the these cylinders 6 at all times. Internally, these three portions 35a-35c of the surge tank 35 communicate together as a single space. As each piston 10 reaches its bottom dead center position, air from the surge tank 35 is aspirated into the combustion chamber 11 of the associated cylinder 6 through the scavenging ports 12.

The side 36 of the middle portion 35a of the surge tank 35, which is nearest to the left cylinder bank BL and opposite to where the mechanical supercharger 10 is offset, is expanded upwardly. The expanded side portion 36 of the surge tank 35 is provided at its upper end with an intake air transition duct 39 having an elliptical or racetrack cross section elongated in the vertical direction and extending rearward in the lengthwise direction. The intake air transition duct 39 is provided at its upper rear end with an air intake port 38 which has a circular cross-section and opens rearward. To this air intake port 38 is connected the air duct 37 connected to the discharge port of the intercooler 33.

In the surge tank 35, there is provided a partition wall 40, formed integrally with the surge tank 35, and hence the cylinder block 2, which extends in the lengthwise direction correspondingly to the intake air transition duct 39, so as to divide the interior space of the intake air transition duct 39 into two sections. The partition wall 40 extends from the lower portion of the intake air transition duct 39 to the bottom of the middle portion 35a of the surge tank 35 passing laterally across the expanded side portion 36 of the middle portion 35a of the surge tank 35. The partition wall 40 has a top free edge and extends vertically downwardly at its upper portion. About its midpoint, however, it curves downwardly and inwardly toward the center or middle of the surge tank 35 between the left and right cylinder banks BR and BL, ultimately terminating at its integration to the apex of the engine block structure that is directly about the oil pan 5. The lower part of the partition wall 40 extends in parallel with the left cylinder bank BL. The partition wall 40 thus shaped appropriately guides air introduced into the surge tank 35 through the air intake port 38 and air intake transition duct 39 directly downwardly into the left portion 35b of the surge tank 35 and therefore directly into the left cylinder bank BL. Meanwhile, the partition wall 40, because it curves inwardly, defects inlet air directly forward the right cylinder bank BR via center portion 35a and right portion 35c. Hence, uniform distribution is achieved.

In the operation of the engine described above, while the engine 1 is operating, then the mechanical supercharger 18 is driven by the engine 1 by means of the actuation of electromagnetic clutch 27a. Air introduced in the supercharger 18 from the air cleaner is compressed by means of the rotation of the female and male rotors 20 and 21, and is expelled from, the air expulsion outlet opening 31. After the compressed air is cooled by the intercooler 33, it is introduced into the surge tank 35 via duct 37 through the air intake port 38. In the engine 1, as each piston 10 is at its bottom dead center, it opens the scavenging ports 12 of its associated cylinder 6 and air within the surge tank 35 is aspirated into the associated combustion chamber 11 through the scavenging ports 12. Subsequently, with the ascent of the piston 10, it opens the scavenging ports 12, so as to compress the air within the combustion chamber 11. During this period, fuel injected from the injectors 13 is mixed with air providing an fuel mixture. When the piston 10 reaches the top dead center, the fuel mixture is ignited by means of the spark plug 14. Subsequently, during the combustion process in which the piston 10 moves downwardly from the top dead center, the exhaust valve 17 is opened, so that burned or exhaust gasses produced by the combustion within the combustion chamber 11 are expelled through the exhaust port 15. In addition, when the piston 10 is in the vicinity of the bottom dead center, as the scavenging ports 12 open, the exhaust gases from within the combustion chamber 11 are expelled. These processes are repeated.

Since the female and male rotors 20 and 21 of the mechanical supercharger 18 are horizontally arranged with one directly positioned above the other, and the air expulsion opening 31 is formed in the left side of the housing 19, the overall height of the engine 1 is lowered in comparison with an arrangement where the female and male rotors 20 and 21 of the mechanical supercharger 18 are arranged horizontally side by side, and the air expulsion opening 31 is formed in the top air of the housing 19. Furthermore, since the mechanical supercharger 18 is offset sideways toward the right cylinder bank BR from the center between the left and right cylinder banks BL and BR, even if the top of the mechanical supercharger 18 is lowered, the air expulsion opening 31 in the left side portion of the housing 19 does not block the left cylinder bank BL, so as to enable decreasing the overall height of the engine 1, the head room required, by lowering the top of the mechanical supercharger 18. In addition, since the middle portion 35a of the surge tank 35, which is on the left cylinder bank BL opposite to where the mechanical supercharger 10 is offset, is expanded upwardly to form the expanded side portion 36, even if the top of the mechanical supercharger 18 is lowered to lower the overall height of the engine 1 as described above, the surge tank 35 can be maintained large in capacity by means of the expanded side portion 36.

Since the mechanical supercharger 18 is offset toward the right cylinder bank BR, and accordingly, the air intake port 38 of the surge tank 35 is offset toward the left cylinder bank BL, the distance between the cylinders 6 of the right cylinder bank BR and the air intake port 38 is longer than the distance between the cylinders 6 of the left cylinder bank BL and the air intake port 38. If there were no partition wall 40, this would generally results in the compressed air, introduced through the air intake port 38, tending to flow within the surge tank 35 only toward the cylinders 6 of the left cylinder bank BL. However, in the engine of the present invention in which the partition wall 40 is provided in the surge tank 35, the air, introduced from the air intake port 38 into the surge tank 35, is guided by the partition wall 40 so as to flow positively and equally to the right portion 35c of the surge tank 35 on the side of the right cylinder bank BR toward which air is generally difficult to flow. Therefore, the air is distributed uniformly into the cylinders 6 of the right and left cylinder banks BL and BR, enabling the maintenance of uniform and equal intake air distribution.

It is to be understood that although the present invention has been describe with respect to a 4-cylinder engine, it may also be utilized with various V-type, multiple cylinder, two cycle engines.

It is also to be understood that although the present invention has been described in detail with respect to a preferred embodiment thereof, various other embodiments and variants may occur to these skilled in the art. Such other embodiments and variants fall within the scope and spirit of the invention and are intended to be covered by the following claims.

What is claimed is:

1. A V-type two cycle, supercharged engine comprising:

an engine having left and right cylinder banks set at an angle to each other to define a V-shaped space therebetween, each cylinder bank including at least two cylinders, and scavenging ports for said cylinders provided in the side of each said cylinder bank;

a mechanical supercharger having a housing disposed in said V-shaped space, a pair of rotors disposed in said housing, said rotors being horizontally arranged in parallel with each other with one positioned directly below the other, the supercharger being mounted offset laterally toward one of said left and right cylinder banks in said V-shaped space, and an air expulsion opening formed in said housing on the side thereof nearest the other of said left and right cylinder banks; and a surge tank in communication with said scavenging ports, said surge tank being disposed below said mechanical supercharger and having a portion being partly expanded upward on the side thereof nearest the other of said left and right cylinder banks.

2. A V-type two cycle, supercharged engine as defined in claim 1, wherein said surge tank is formed with an air intake opening communicating with the partly expanded upward portion and being provided with a partition wall disposed within the partly expanded upward portion, said partition wall guiding air introduced into said surge tank through said air intake opening toward the side of said surge tank nearest said one of said left and right cylinder banks.

3. A V-type two cycle, supercharged engine as defined in claim 1, wherein said surge tank is formed integrally with said left and right cylinder banks.

4. A V-type two cycle, supercharged engine as defined in claim 1, wherein said surge tank comprises a middle tank portion extending in said V-shaped space which accommodates placement of said mechanical supercharger thereon, a left tank portion shaped so as to surround lower portions of said cylinders of said left cylinder bank and to communicate at its upper end with said scavenging ports of said cylinders of said left cylinder bank, and a right tank portion shaped so as to surround lower portions of said cylinders of said right cylinder bank and to communicate at its upper end with said scavenging ports of said cylinders of said right cylinder bank.

5. A V-type two cycle, supercharged engine as defined in claim 1, wherein said mechanical supercharger has an air intake opening formed in said housing so as to open rearward.

* * * * *